No. 639,028. Patented Dec. 12, 1899.
F. M. GARCELON & W. V. THRELFALL.
SPLIT BUSH BEARING FOR LIFTING RODS.
(Application filed Mar. 21, 1899.)
(No Model.)
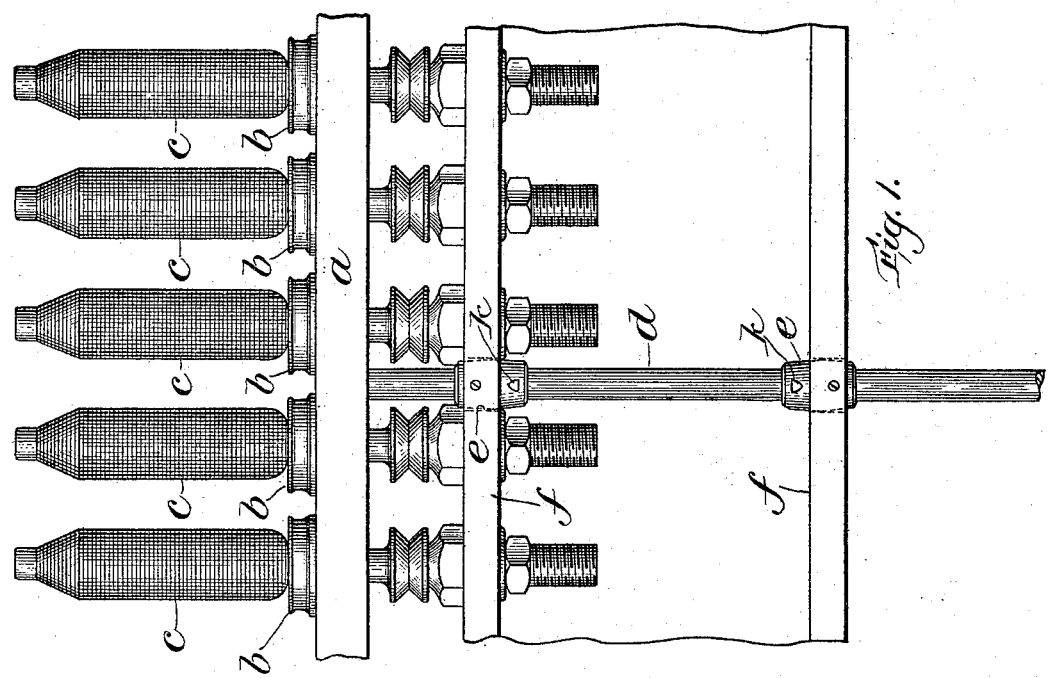
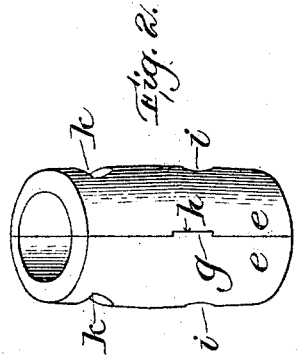
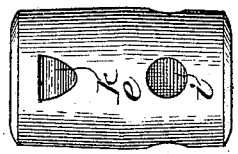
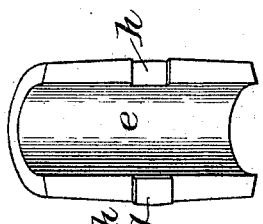
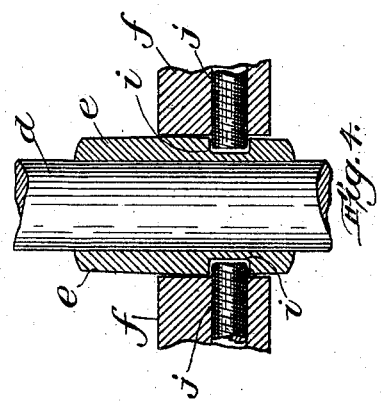
Witnesses:
Roy T. Hill
Arthur J. Randall
Inventors:
F. M. Garcelon,
W. V. Threlfall.
by Crossley & Goddard,
Attorneys.

UNITED STATES PATENT OFFICE.

FRED M. GARCELON, OF LEWISTON, AND WILLIAM V. THRELFALL, OF BIDDEFORD, MAINE, ASSIGNORS TO THE SACO & PETTEE MACHINE SHOPS, OF BIDDEFORD, MAINE, AND NEWTON, MASSACHUSETTS.

SPLIT BUSH-BEARING FOR LIFTING-RODS.

SPECIFICATION forming part of Letters Patent No. 639,028, dated December 12, 1899.

Application filed March 21, 1899. Serial No. 710,000. (No model.)

*To all whom it may concern:*

Be it known that we, FRED M. GARCELON, of Lewiston, in the county of Androscoggin, and WILLIAM V. THRELFALL, of Biddeford, in the county of York, State of Maine, have invented certain new and useful Improvements in Split Bush-Bearings for Lifting-Rods, of which the following is a description sufficiently full, clear, and exact to enable those skilled in the art to which it appertains or with which it is most nearly connected to make and use the same.

This invention has relation generally to lateral bearings for movable rods where the rods are connected at each of their ends in such manner as to preclude the removal of their bearings without the removal of one of their end connections; and it has special reference to lifting-rods for reciprocating the ring-rail of spinning-machines and machines of a cognate nature.

In the operation of spinning-machines it frequently becomes necessary to clean the lateral bearings of the lifting-rods. Inasmuch as the said rods are connected at their upper ends to the ring-rail and at their lower ends to the operating-lever as the bearings have heretofore been constructed, it has been necessary to lift off the rail or remove the lower connection in order to slip the bearing off to cleanse or renew it.

It is the purpose of our invention to provide a split bush-bearing for employment in the connection mentioned which shall be readily removable without disconnecting the end connections of the lifting-rod, which may be removed and cleansed while the machine is in operation, which will allow of some movement from an absolute vertical position in order that the bearings may adjust themselves in alinement with the movement of the rod and in which one split part may be the exact counterpart of the other, so that the ends of economy may be secured, and in assembling the parts to form a complete bearing no time nor mental effort need be expended in selecting them.

To these ends the invention consists of a bearing for the purposes mentioned composed of two parts formed as though a complete cylindrical bearing were split longitudinally and centrally with a centrally-arranged lug on one edge and a recess corresponding as to form and location on the opposite edge, the outer surface of the bearing tapering from or about its center to its ends, all as we will now proceed to describe in detail and then particularly point out and claim.

Reference is to be had to the annexed drawings, and to the letters marked thereon, forming a part of this specification, the same letters designating the same parts or features, as the case may be, wherever they occur.

Of the drawings, Figure 1 is a front view of our invention, showing it as in use in connection with the lifting-rod of a spinning-frame. Fig. 2 is a side view in perspective of the invention drawn to an enlarged scale. Fig. 3 is a front view of the same. Fig. 4 is a sectional view taken on a line running from front to rear through the supporting-rail. Fig. 5 is a face view of two similar parts capable of being assembled to form a complete bearing.

In the drawings, $a$ designates the ring-rail of a spinning-machine.

$b$ are the rings on the rail $a$, through which the bobbins $c$ are reciprocated by the longitudinally-reciprocating movements of the lifting-rod $d$, which is supported laterally by the bearings $e$ in the bars or rails $ff$.

In order to make the bearings removable without disconnecting the end connections of the rod, we make the said bearing in two parts, as though a previously-intact bearing had been split centrally and longitudinally, as is clearly shown in Fig. 5. To prevent one part from slipping upon the other, we form a lug $g$ on one of the meeting edges, and at a diametrically opposite point on the other edge we form a corresponding recess $h$, and we make one part the exact counterpart of the other for the sake of economy of construction and to facilitate the selection and assemblage of the parts.

$i$ designates recesses formed in the front and rear sides of the bushing for the reception of the ends of the holding-screws $j$, which are tapped through the rails. The ends of the screws preferably do not extend to the bottom of the said recesses.

The outer surface or periphery of the bearing is appreciably crowned in form, or, in other words, is made tapering from or about the center to the ends, so that the bearing when in place may be allowed to rock or move from a vertical to an inclined position in order to aline itself exactly to the line of movement of the lifting-rod and so avoid any binding of the latter in the bearing. It will be noted in this connection that the bearing has practically a line contact with the walls of the opening in the rail, and hence is readily self-adjusting.

$k$ designates nicks formed in the outer surface of the bearing near the end for the reception of the end of a screw-driver or other tool or thing to drive or lift the bearing out of place in the rails $f$.

It will be seen that with a bearing of the construction described all of the advantageous functions hereinbefore ascribed to it will be readily accomplished to the ends of saving time and securing an easier and steadier operation of the lifting-rods besides providing against undue wear of the bearings.

It is to be noted that the bearing constructed as described is capable of insertion and removal from above or below the rail, whichever may be most convenient. Furthermore, the employment of two screws, one engaging each member of the bearing, insures their retention in proper position without relying upon the interlocking of the sections. Furthermore, the interlocking construction or formation hereinbefore specifically described is such as to insure proper endwise assemblage of the two parts of the bearing, it being an object to render these parts non-reversible end for end with respect to each other, since the exterior contour of the bearing differs on opposite sides of a transverse median line thereof.

Having thus explained the nature of the invention and described a way of constructing and using the same, though without attempting to set forth all of the forms in which it may be made or all of the modes of its use, it is declared that what is claimed is—

1. The combination, with the longitudinally-movable rod or shaft and the rail or support having an opening of uniform diameter for the passage of said shaft therethrough; of a split bush-bearing for the rod tapered toward each end and insertible in the opening of the rail from either side of the latter, said bearing being composed of substantially semicylindrical sections whose abutting edges have interlocking formations preventing relative longitudinal movement of the sections; together with means for holding the bearing in place, substantially as described.

2. The combination with the longitudinally-movable rod or shaft and the rail or support apertured for the passage of said shaft therethrough; of a split bush-bearing composed of substantially semicylindrical sections fitting around the shaft or rod in line contact with the walls of the aperture in the rail and having exterior oppositely-located recesses or sockets; together with screws entered through the rail and occupying said recesses or sockets respectively.

In testimony whereof we have signed our names to this specification, in the presence of two subscribing witnesses, this 23d day of February, A. D. 1899.

FRED M. GARCELON.
WILLIAM V. THRELFALL.

Witnesses for F. M. Garcelon:
JOHN A. MORRILL,
FRED O. WATSON.

Witnesses for W. V. Threlfall:
ARTHUR W. CROSSLEY,
ANNIE J. DAILEY.